UNITED STATES PATENT OFFICE.

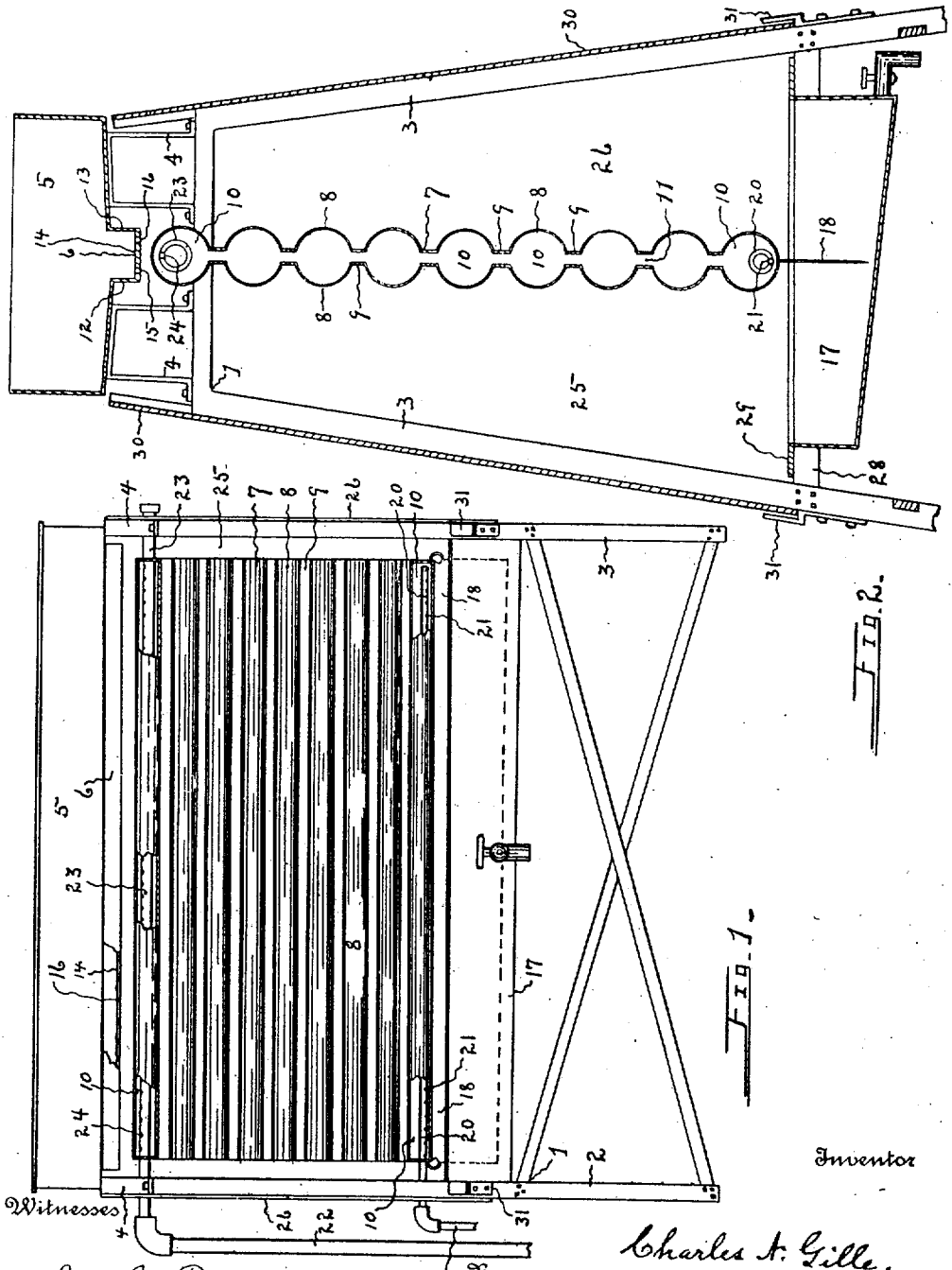

CHARLES N. GILLE, OF OMAHA, NEBRASKA.

MILK-REFRIGERATING APPARATUS.

968,550.   Specification of Letters Patent.   Patented Aug. 30, 1910.

Application filed December 6, 1909. Serial No. 531,525.

*To all whom it may concern:*

Be it known that I, CHARLES N. GILLE, a citizen of the United States, residing at Omaha, in the county of Douglas and State of Nebraska, have invented certain new and useful Improvements in Milk-Refrigerating Apparatus, of which the following is a specification.

This invention relates to an improved milk refrigerating apparatus for use in connection with the pasteurization of milk, and has for its object to provide an apparatus by use of which, milk, after it has been heated to a high degree of temperature, may be quickly and reliably cooled.

The invention has reference to a construction whereby milk may be conducted upon curved surfaces by gravity, and exposed, during its passage, to a moving liquid refrigerant moving in a direction opposite to the movement of the milk, and moving in a vertically disposed jacket, closely adjacent to the passage ways of the milk.

The invention includes the manner of forming the interior and exterior surfaces of the refrigerating jacket, and means for directing the flow of the refrigerant, whereby operation may be effective for cooling milk quickly, and within a small compass or space, and requiring a construction of parts attended with slight, comparative expense.

The invention consists of the novel construction and arrangement of parts as described and claimed, and as illustrated in the accompanying drawing, wherein,—

Figure 1 is a vertical, side view, partly broken away, of a milk refrigerating apparatus, the side covers being omitted. Fig. 2 is a transverse vertical, sectional view, somewhat enlarged, of the apparatus, the legs or supporting part being broken away.

The several parts of the apparatus may be constructed to advantage by use of sheet metal, except the distributing or intake pipe and waste pipe, although I do not wish to limit myself to this material.

Referring now to the drawing for a more particular description, numeral 1 indicates a suitable frame, comprising parallel, upright end-sections 2 and 3, and said sections may be formed substantially A-shaped to advantage.

Upon the horizontal, upper ends of the end-sections may be secured upright brackets 4 for a support, removably thereon, of the milk tank 5, the bottom of said tank having a depressed portion or longitudinal trough 6 with a perforated bottom, said trough being midway between the sides of the tank.

I provide a refrigerating jacket 7 adapted to contain a fluid refrigerant under pressure, said jacket being, generally speaking, an attenuated, rectangular receptacle. It is mounted and disposed vertically upon the frame and is provided with uniform side walls, each of its side walls being formed with a plurality of longitudinal, outwardly-curved wall-portions 8 disposed horizontally and parallel, with reference to each other, and connected by an intervening web 9, wall-portions 8 of each of the sides of the receptacle being disposed opposite to each other, the webs also being disposed parallel and opposite to each other, and closely adjacent. As thus described, each of the oppositely-disposed, outwardly-curved walls 8 provide longitudinal, horizontal chambers 10 extending the entire length of the jacket, and the oppositely-disposed webs provide narrow longitudinal passageways 11 between said chambers, and as is apparent, if an exit way is provided in the wall of the uppermost chamber 10, a liquid refrigerant, when forced within the lowermost chamber 10 will move upward through all of chambers 10 and passageways 11, the entire jacket, at this time, being filled with the liquid refrigerant.

At regular longitudinal intervals adjacent to the upright walls 12 and 13, in the bottom 14 of trough 6 are provided the series of alining perforations indicated, respectively, at 15 and 16, through which milk to be cooled, may pass, the flow of milk being regular, since the bottom of the trough is horizontal and the perforations therein, are uniform.

Jacket 7 is disposed beneath trough 6, and each of the curved walls 8 of the jacket is disposed below one of the series of perforations 15 or 16, and in operation the milk will be equally divided, one-half of the contents passing downward upon each of the sides of jacket 7.

The downward movement of milk upon the jacket will be retarded by reason of the outwardly curved walls 8 over which it must move before it reaches the receiving tank 17, and it will be noted that the exterior surface of the jacket is such, that while the downward movement of the milk will be retarded, there are no wings, terminal walls or uneven surfaces to cause churning or precipitation. After leaving the jacket, the milk passes into the receiving tank by flowing downward upon the sides of the vertical sheet or flow-plate 18; and this plate may be attached in any convenient manner to the lower terminal of the jacket, and its use tends to prevent precipitation or churning of the milk.

A liquid refrigerant, under pressure, may pass through supply pipe 19. This pipe has a horizontal stem 20 disposed in the lowermost chamber 10 of jacket 7; and at 21 are indicated perforations formed in alinement and at regular longitudinal intervals in the lowermost part of its wall, so that there may be an equal distribution of the liquid refrigerant throughout the entire length of the jacket.

At 22 is indicated a waste pipe provided with a horizontal stem or section 23 traversing the uppermost chamber 10 of the jacket, and in the uppermost part of its wall are provided perforations 24, these perforations being formed in that part of the stem or section disposed within the water jacket; and, in practice, the liquid refrigerant will have a movement upwardly through the jacket, from the lowermost to the uppermost parts of its interior. The movement of said liquid is transversely of the jacket, thereby tending to provide a uniformity in the distribution of the same, the upward movement being at the ends as well as the middle of the jacket; and during these movements heat will be absorbed from the milk while the latter passes downward upon the exterior surface of the jacket.

In order that the milk may be kept clean during operation, jacket 7 is housed within chamber 25. The top and bottom of this chamber is provided, respectively, by tanks 5 and 17; and upon the upper part of the frame are secured plates 26 to provide end walls for said chamber. End-sections 2 and 3 are provided with horizontal cross strips 28, these strips being disposed at an altitude below jacket 7, and they operate as supports for the end-flanges 29 of the removable receiving tank 17.

I provide side-plates or covers 30, and their lower edges are adapted to have seatings upon brackets 31, these brackets being secured upon the outer sides of each of the end sections, adjacent to cross strips 28. Plates 30 provide side walls for chamber 25 and they have an area sufficient to cover the space intermediate the end sections and between tanks 5 and 17. They may be conveniently removed, and the sides of the jacket are then accessible for cleaning purposes; and when placed in position, the plates require no fastenings but are held by their own weight since they rest upon the upwardly convergent sides of the A-shape end-sections.

Milk pasteurizers or sterilizers are no quite generally used by milk dealers, and i such use it is desirable, after the temper; ture of the milk has been raised to the r quired degree of heat, to quickly reduce th temperature. The construction for th purpose as herein shown, provides a cor venient, effective and comparatively ine; pensive apparatus. City water under pre: sure is the most economical refrigerar known for this purpose, and when used i connection with said apparatus, is conver ient for effectually reducing the temperatur Having fully explained the several par and their uses, a further description is no necessary.

What I claim, and desire to secure b Letters Patent is,—

1. A refrigerating apparatus comprisin a suitably supported, upright, elongated r frigerating jacket having each of its ac jacent sides formed of outwardly-curvec parallel, horizontally disposed wall-portior with intervening webs, the outwardly-curve wall portions of each of said adjacent side being disposed opposite to each other an providing a plurality of longitudinal chan bers; a supply pipe having a plurality o perforations disposed in the lowermost lor gitudinal chamber, and a waste pipe havin a plurality of perforations disposed in th uppermost longitudinal chamber of sai jacket; and means for distributing a liqui upon the upper part of said jacket, bot the supply and waste pipes extending fror end to end of the chambers in which they ar located.

2. A refrigerating apparatus comprisin a suitably supported, upright, elongated r frigerating jacket having each of its adja cent sides formed of outwardly-curvec parallel, horizontally disposed wall-portion with intervening webs, the outwardly-curve wall portions of each of said adjacent side being disposed opposite to each other an providing a plurality of longitudinal chan bers; a supply pipe disposed in the lowe: most longitudinal chamber of said jacke and having perforations formed at longitu dinal intervals in the lowermost part of it wall; a waste pipe disposed in the uppe: most longitudinal chamber of the jacke and having perforations formed at long: tudinal intervals in the uppermost parts o its wall; and a suitably supported mil receptacle having discharge ports in con munication with the sides of said jacke both the supply and waste pipes extendin from end to end of the chambers in whic they are located.

3. A refrigerating apparatus comprisin a suitably supported upright, elongated r frigerating jacket having each of its adjacent sides formed of outwardly-curved, parallel, horizontally disposed wall-portions with intervening webs, the outwardly-curved wall-portions of each of said adjacent sides being disposed opposite to each other and providing longitudinal chambers, the webs between the outwardly-curved wall-portions of the sides of the jacket being disposed opposite to each other and forming longitudinal recesses opening upon said longitudinal chambers; a supply pipe disposed in the lowermost longitudinal chamber of said jacket and provided at longitudinal intervals with discharge ports; a waste pipe having intake ports provided at longitudinal intervals and disposed in the uppermost longitudinal chamber of the jacket; and a suitably supported milk receptacle having discharge ports in communication with the sides of said jacket, both the supply and waste pipes extending from end to end of the chambers in which they are located.

4. The combination with an upright frame having end-covers and formed with upwardly convergent sides, of an upright, rectangular casing supported by the frame and having outwardly curved wall portions with intervening webs forming its sides, the curved wall portions of each of said sides being disposed, respectively, in vertical alinement; perforated, tubular members disposed longitudinally within and near the respective upper and lower terminals of said casing, means to cause a movement of a liquid refrigerant from one to another of said tubular members; milk feeding devices having discharge ports in communication with the upper part of said casing; and side plates removably mounted upon the convergent sides of the frame intermediate said end-covers.

5. The combination with an upright frame having end-covers and formed with upwardly convergent sides, of an attenuated, rectangular water jacket supported by the frame and disposed vertically intermediate the end-covers; a perforated distributing-pipe disposed horizontally in the lower part and a perforated receiving-pipe disposed horizontally in the upper part of said jacket; a feeding tank upon the frame overhanging and having discharge ports in communication with the upper surface of the water jacket; a receiving tank supported by and covering the area, substantially, intermediate the corvergent sides and end-covers of said frame; and a pair of removable side-covers adapted to have seatings upon the convergent sides of the frame intermediate said end-covers.

In testimony whereof I have affixed my signature in presence of two witnesses.

CHARLES N. GILLE.

Witnesses:
HIRAM A. STURGES,
E. L. HUMPHREY.